United States Patent [19]

Durkee

[11] Patent Number: 4,657,703
[45] Date of Patent: Apr. 14, 1987

[54] METHOD OF IMPROVING THE COLOR OF TALL OIL ROSIN ESTERS

[75] Inventor: Susan C. Durkee, Wilmington, Del.

[73] Assignee: Hercules Incorporated, Wilmington, Del.

[21] Appl. No.: 880,523

[22] Filed: Jun. 30, 1986

[51] Int. Cl.[4] .......................... C09F 1/04; C09F 7/00; C08L 93/04
[52] U.S. Cl. .................................... 260/104; 260/97.5
[58] Field of Search ............................... 260/97.5, 104

[56] References Cited

U.S. PATENT DOCUMENTS

| 1,782,267 | 11/1930 | Logan | 260/97 |
|---|---|---|---|
| 1,887,097 | 11/1932 | Humphrey | 260/97 |
| 1,894,975 | 1/1933 | Borglin | 260/97 |
| 2,862,943 | 12/1958 | Wheeler | 260/419 |
| 3,112,209 | 11/1963 | Bradley | 260/97.5 |
| 3,423,389 | 1/1969 | Wheelus | 260/97.5 |
| 3,780,012 | 12/1973 | Smith | 260/104 |
| 3,780,013 | 12/1973 | Smith | 260/97.5 |
| 4,222,933 | 9/1980 | Alford | 260/107 |
| 4,339,377 | 7/1982 | Hollis | 260/97.5 |
| 4,548,746 | 10/1985 | Duncan et al. | 260/97.5 |
| 4,585,584 | 4/1986 | Johnson et al. | 260/97.5 |

Primary Examiner—Herbert S. Cockeram
Attorney, Agent, or Firm—Joanne L. Horn

[57] ABSTRACT

Disclosed is a method of improving the color of tall oil rosin esters comprising the sequential steps of (a) heating and stirring a tall oil rosin in the presence of a Lewis acid catalyst to form a mixture, (b) distilling the mixture to provide a tall oil rosin distillate, and (c) esterifying the tall oil rosin distillate with a polyol in the presence of a phenol sulfide compound. The improved tall oil rosin esters produced thereby are useful in the manufacture of a variety of products, such as paper and textile sizes, plasticizers for polyolefin films, paints, varnishes, hot melt adhesives and pressure sensitive adhesives.

12 Claims, No Drawings

METHOD OF IMPROVING THE COLOR OF TALL OIL ROSIN ESTERS

This invention relates to a method of improving the color of tall oil rosin esters and to the tall oil rosin esters produced therefrom.

Rosin is composed mainly of a mixture of diterpene acids, known as resin acids, with a smaller amount of other acidic and neutral bodies present. Rosin characteristically contains color bodies or coloring matter visible to the naked eye and certain color bodies which are not normally visible to the naked eye, usually referred to as latent color bodies. In crude wood rosin, the latent color bodies have a tendency to darken and discolor the wood rosin when such color bodies are exposed to the action of air and an alkali, as for example, when the wood rosin is saponified. Hence, the latent color bodies in wood rosin are alkali-sensitive color bodies. Gum rosin does not appear to contain latent color bodies.

For tall oil rosin, however, the latent color bodies contained therein do not color the tall oil rosin until the rosin is treated with pentaerythritol or other polyols to form an ester, or heated in the presence of oxygen, such as in the manufacture of hot melt adhesives.

The visible coloring matter in a tall oil, wood or gum rosin determines its grade and hence its value. The darker the rosin, the lower its grade and value. The presence of invisible or latent color bodies, while not affecting the apparent grade, is highly disadvantageous in the case of tall oil rosin since they render the polyol esters produced therefrom undesirable for use in the production of products where palest color of the product and retention of color are desired.

Typically, for example, the color of the tall oil rosin goes from an initial color of WW to a color of H (six color grades) during esterification with pentaerythritol and degrades by one color grade with glycerine. On the other hand, wood rosin actually improves during esterification with pentaerythritol, and gum rosin does not degrade in color upon esterification with polyols.

It is known in the art to treat rosin solutions with a metallic chloride, such as zinc, tin, titanium, and antimony chlorides, to precipitate the alkali-sensitive latent color bodies (see, U.S. Pat. Nos. 1,781,267, 1,887,097 and 1,894,975). The rosin solution is then filtered to separate the rosin solution and the precipitate. Optionally, the rosin may be distilled (see, U.S. Pat. No. 1,887,097).

U.S. Pat. No. 2,862,943 relates to the distillation of fatty acids in the presence of a small amount of a boric acid compound to improve their color.

It is further known in the art to pretreat rosin and tall oil rosin at elevated temperatures in the presence of a phenol sulfide of the formula set forth herein below to bleach and stabilize the rosin and tall oil rosin (see, U.S. Pat. No. 3,423,389), and to esterify tall oil rosin with pentaerythritol in the presence of incremental additions of the phenol sulfide (see, U.S. Pat. No. 3,780,013).

The rosin color standards used herein are the United States Department of Agriculture (USDA) rosin standards which vary from XC (lightest) through XB, XA, X, WW, WG, N, M, K, I, H, G, F, E and D (darkest).

According to the present invention, there is provided a method of improving the color of tall oil rosin esters comprising the sequential steps of (a) heating and stirring a tall oil rosin in the presence of a Lewis acid catalyst to form a mixture, (b) distilling the mixture to provide a tall oil rosin distillate, and (c) esterifying the tall oil rosin distillate with a polyol in the presence of a phenol sulfide having the formula:

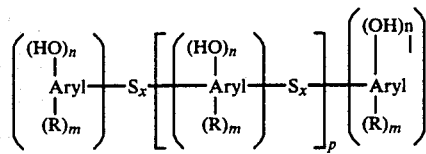

wherein n is an integer from 1 to 3, p is an integer from 0 to 100, the sum of m and n on each Aryl is preferably between 1 and 5, x is 1 to 3, and R is a $C_{1-22}$ hydrocarbon group. Suitable hydrocarbyl groups include straight and branched alkyl, cycloalkyl and substituted straight and branched alkyl wherein the substituents include cycloalkyl, aryl and alkaryl. Suitable Aryl groups include those containing 6 to 18 carbon atoms, such as phenyl, naphthyl and anthracyl. Typical cycloalkyl groups contain 3-8 carbon atoms, such as cyclopropyl, cyclopentyl and cyclohexyl.

The pentaerythritol ester of tall oil rosin prepared according to this invention is 7 to 8 color grades lighter and the glycerine ester is typically 2 to 3 color grades lighter than the same ester produced from an untreated tall oil rosin.

Tall oil rosin is isolated from crude tall oil. Crude tall oil is obtained by acidulation of the "black liquor soap" skimmed off the concentrated alkaline digestion liquor washed out of paper pulp in the sulfate or kraft process for the manufacture of paper. The crude tall oil is then subjected to a series of fractional distillations to separate the rosin from the fatty acids and pitch to provide a tall oil rosin having a mixture of rosin and fatty acids. Depending on the cut, the tall oil rosin may have a resin acid content from about 1% to about 99% by weight. For purposes of this invention, tall oil rosin means tall oil rosin having a resin acid content of from about 80% to about 99%, preferably from about 86% to about 94%.

The Lewis acid catalyst may be added with the tall oil rosin or after the tall oil rosin is melted. Typical Lewis acid catalysts include aluminum chloride, zinc chloride, stannic chloride, boric acid, boron trichloride, and boron trifluoride. The Lewis acid catalyst is typically present in an amount from 0.05 to about 2%, by weight, preferably from about 0.1 to about 1%, and most preferably from about 0.1 to about 0.3%.

The tall oil rosin and Lewis acid catalyst are generally heated at about 100° C. to about 300° C. for about 5 seconds to about 30 minutes, preferably from about 150° C. to about 200° C. for about 5 to about 15 minutes.

The tall oil rosin is heated in the presence of a Lewis acid catalyst to reduce the volatility of latent color formers, plus some visible color bodies.

Phenolic compounds, possibly derived from lignin precursors, present in the unrefined tall oil rosin are believed to be the latent color formers primarily involved in the color degradation when the tall oil rosin is esterified with pentaerythritol or other polyols. It is theorized the Lewis acid catalyst promotes the alkylation of the phenolic compounds with endogenous electrophiles, such as resin acids, thereby reducing the volatility of the phenols and facilitating their removal in the distillation step.

The treated tall oil rosin is then distilled to remove these latent color bodies and some of the visible color formers, which remain in the distillation vessel. The tall oil rosin distillate has a USDA color of XB to XA.

Conditions typical for the distillation of tall oil rosin are about 150° C. to about 300° C. at pressures of about 0.05 to about 50 mm Hg. Up to 96% of the original charge may be distilled. Oxygen should be excluded as much as possible to avoid oxidation of the rosin.

The tall oil rosin distillate is then esterified in the presense of a phenol sulfide having the formula set forth herein above. Preferably the phenol sulfide is added all at once at the start of the esterification reaction. Typically from about 0.05 to about 1.0% by weight of the phenol sulfide is used, preferably from about 0.1 to 0.5%.

Suitable phenol sulfide compounds useful in the practice of this invention include thiobisnaphthols, 2,2'-thiobis phenols, 3,3'-thiobisphenols, 4,4'-thiobis(resorcinol) and t,t'-thiobis(pyrogallol). Other typical phenol sulfides useful in the practice of this invention are set forth in U.S. Pat. No. 3,423,389, the disclosures of which are incorporated herein by reference. Thiobis phenols, such as 4,4'-thiobis(6-t-butyl-m-cresol) and 4/4'-thiobis(6-t-butyl-o-cresol), are preferred.

The phenol sulfides useful in the practice of this invention are commercially available or can be prepared by methods known to those skilled in the art. Typical methods of preparation are set forth in U.S. Pat. No. 3,423,389.

All parts and percentages used in this specification are by weight unless otherwise indicated.

This invention is more particularly described and illustrated by the following specific examples.

EXAMPLE 1

This example illustrates the preparation of a tall oil rosin having improved color by an embodiment of this invention.

A reaction vessel fitted with a magnetic stir bar, a thermometer and a receiver is charged with 100 parts of tall oil rosin having a USDA color of WW and a resin acid content of 91%, then flushed with nitrogen, and heated to about 180° C. with agitation until the tall oil rosin is melted (about 20 minutes). Three-tenths (0.3) parts of zinc chloride are added to the vessel while maintaining the nitrogen atmosphere. The contents of the vessel are then heated at about 200° C. for about 30 minutes with agitation. The vessel is then evacuated via a mechanical pump which is attached to the receiver, and the temperature is gradually raised under 1 mm Hg pressure to a temperature of about 210° C. until the rosin begins to distill. Distillation is complete in about 45 minutes. Ninety (90) parts of a tall oil rosin product distillate is recovered and has a USDA color of XB.

EXAMPLE 2

This example illustrates the preparation of the pentaerythritol ester according to this invention.

A reaction vessel, fitted with a distillation head and receiver for the collection of water and a thermometer to monitor the tall oil rosin temperature, is charged with 100 parts of the tall oil rosin having a USDA color of XB of Example 1, 0.3 parts of 2,2'-thiobis(6-t-butyl-m-cresol), 12.7 parts pentaerythritol and 0.2 parts calcium formate catalyst. The mixture is heated under inert atmosphere to 285° C. and is stirred until the acid number (acid number is equal to the milligrams of normalized potassium hydroxide in a methanol solution required to titrate 1 g of rosin) drops to a value of 10 to 16 (about 8 hours). One hundred seven (107) parts of the pentaerythritol ester of the tall oil rosin is recovered having a USDA color of XA.

EXAMPLE 3

This example illustrates another preparation of a tall oil rosin having improved color by an embodiment of this invention.

The formulation and procedures of Example 1 are used except that 0.1 part of zinc chloride is used instead of 0.3 parts. The resultant tall oil rosin product has a USDA color of XA.

EXAMPLE 4

This example illustrates another preparation of the pentaerythritol ester according to this invention.

The procedures and formulation of Example 2 are used except that 100 parts of the tall oil rosin having a USDA color of XA of Example 3 is used instead of 100 parts of the tall oil rosin having a USDA color of XB of Example 1. The resultant ester has a USDA color of XA.

EXAMPLE 5

This example illustrates the preparation of the glycerol ester of tall oil rosin according to this invention.

The procedure and ingredients of Example 2 is used except that 18.5 parts glycerol is used instead of 12.7 parts pentaerythritol, and except that the mixture is heated to 240° C. for 30 minutes, and then the temperature is raised to 275° C. until the acid number drops to 3 to 9 (about 10 hours). One hundred eight (108) parts of the glycerol ester of tall oil rosin is recovered having a USDA color of XA.

EXAMPLE 6

This example illustrates another preparation of a tall oil rosin having improved color by an embodiment of this invention.

The formulation and procedures of Example 1 are used except that 1.0 part zinc chloride is used instead of 0.3 parts. The resultant tall oil rosin product has a USDA color of XB.

EXAMPLE 7

This example illustrates another preparation of the pentaerythritol ester according to this invention.

The procedures and formulation of Example 2 are used except that 100 parts of the tall oil rosin having a USDA color of XB of Example 6 is used instead of 100 parts of the tall oil rosin having a USDA color of XB of Example 1. The resultant ester has a USDA color of XA.

EXAMPLE 8

This example illustrates another preparation of a tall oil rosin having improved color by an embodiment of this invention.

The formulation and procedures of Example 1 are used except that aluminum chloride is used instead of zinc chloride. The resultant tall oil rosin product has a USDA color of XA.

EXAMPLE 9

This example illustrates another preparation of the pentaerythritol ester according to this invention.

The procedures and formulation of Example 2 are used except that 100 parts of the tall oil rosin having a USDA color of XA of Example 8 is used instead of 100 parts of the tall oil rosin having a USDA color of XB of Example 1. The resultant ester has a USDA color of XA.

COMPARATIVE EXAMPLE 10

This comparative example illustrates the formation of a pentaerythritol ester from tall oil rosin which has not been heated in the presence of a Lewis acid catalyst and then distilled according to this invention.

A reaction vessel, fitted with a distillation head and receiver for the collection of water and a thermometer to monitor the tall oil rosin temperature, is charged with 100 parts of tall oil rosin having a USDA color of WW, 12.7 parts pentaerythritol, 0.3 parts of 2,2'-thiobis(6-t-butyl-m-cresol), and 0.2 parts calcium formate catalyst. The resulting mixture is heated under inert atmosphere to about 285° C. and is stirred until the acid number (acid number is equal to the milligrams of potassium hydroxide required to titrate 1 g of rosin) drops to a value of 10 to 16 (about 8 hours). One hundred seven (107) parts of the pentaerythritol ester of the tall oil rosin is recovered having a USDA color of K.

COMPARATIVE EXAMPLE 11

This example illustrates the preparation of the pentaerythritol ester of the tall oil rosin of Comparative Example 10 absent the phenol sulfide.

The procedures and ingredients of Example 2 are used except that 100 parts of the tall oil rosin having a USDA color of XB of Comparative Example 10 are used instead of 100 parts of the tall oil rosin having a USDA color of XB of Example 1 and except that the phenol sulfide is omitted. One hundred seven (107) parts of the pentaerythritol ester of the tall oil rosin is recovered having a USDA color of H.

COMPARATIVE EXAMPLE 12

This comparative example illustrates the distillation of tall oil rosin which has not been heated in the presence of a Lewis acid catalyst according to this invention.

A vessel fitted with a magnetic stir bar, a thermometer and a receiver is charged with 100 parts of tall oil rosin having a USDA color of WW and a resin acid content of 91%, flushed with nitrogen and heated to 200° C. The vessel is then evacuated via a mechanical pump which is attached to the receiver, and the temperature is gradually raised under 1 mm Hg pressure to a temperature of about 210° C., and the tall oil rosin begins to distill. Distillation is complete in about 45 minutes. Ninety-two (92) parts of tall oil rosin distillate product is recovered and has a USDA color of XA.

COMPARATIVE EXAMPLE 13

This example illustrates the preparation of the pentaerythritol ester of the tall oil rosin of Comparative Example 12 in the absence of a phenol sulfide compound.

The procedures and ingredients of Example 2 are used except that 100 parts of the tall oil rosin having a USDA color of XA of Comparative Example 12 are used instead of 100 parts of the tall oil rosin having a USDA color of XB of Example 1. One hundred seven (107) parts of the pentaerythritol ester of the tall oil rosin is recovered having a USDA color of I.

Hence Comparative Examples 12 and 13 show that while flash distillation of the tall oil rosin prior to esterification improves its color from WW to XA, the loss of six to seven color grades (XA to K or I) still occurs upon esterification with pentaerythritol.

COMPARATIVE EXAMPLE 14

This example illustrates the preparation of the pentaerythritol ester of the distilled tall oil rosin of Comparative Example 12.

The procedures and ingredients of Example 2 are used except that 100 parts of the distilled tall oil rosin having a USDA color of XA of Comparative Example 12 are used instead of 100 parts of the tall oil rosin having a USDA color of XB of Example 1. One hundred seven (107) parts of the pentaerythritol ester of the tall oil rosin is recovered having a USDA color of WG.

Comparative Example 14 demonstrates that pentaerythritol esters prepared in the presence of a phenol sulfide from a tall oil rosin which is simply distilled prior to esterification provides a color improvement of 3 color grades over the same ester prepared in the presence of the same phenol sulfide from an untreated tall oil rosin. Further, the ester of comparative Example 14 is three (3) color grades darker than the pentaerythritol ester prepared according to this invention.

COMPARATIVE EXAMPLE 15

This comparative example illustrates the preparation of the pentaerythritol ester of the tall oil rosin of Example 1 absent a phenol sulfide compound.

The procedure and formulation of Example 2 is used except that the phenol sulfide compound is not added. One hundred seven (107) parts of a tall oil rosin ester having a USDA color of WG is recovered.

COMPARATIVE EXAMPLE 16

This comparative example illustrates the preparation of the pentaerythritol ester of the tall oil rosin of Example 6 absent a phenol sulfide compound.

The procedures and formulation of Example 2 are used except that 100 parts of the tall oil rosin having a USDA color of XB of Example 6 is used instead of 100 parts of the tall oil rosin having a USDA color of XB of Example 1 and except that the phenol sulfide compound is not added. The resultant ester has a USDA color of I.

The Examples and Comparative Examples set forth above clearly demonstrate that the three step method of this invention must be used in order to provide the tall oil rosin esters having the typically improved color of this invention. For example, if one or more of these steps is omitted, the 7-8 color grade improvement in the pentaerythritol ester of this invention is not observed.

Thus, this invention provides a method for improving the color of tall oil rosin esters. The tall oil rosin esters thus produced are useful in a variety of applications, such as paper and textile sizes, plasticizers for polyolefin films, paints, varnishes, hot melt adhesives and pressure sensitive adhesives.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A method of improving the color of tall oil rosin esters comprising the sequential steps of:
   (a) heating and stirring a tall oil rosin in the presence of a Lewis acid catalyst to form a mixture;
   (b) distilling the mixture to provide a tall oil rosin distillate; and
   (c) esterifying the tall oil rosin distillate with a polyol in the presence of a phenol sulfide having the formula:

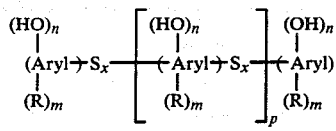

wherein n is an integer from 1 to 3, p is an integer from 0 to 100, x is 1 to 3, the sum of m and n on each Aryl is between 1 and 5, and R is a $C_{1-22}$ hydrocarbon group.

2. The method of claim 1 wherein the Lewis acid catalyst is selected from the group consisting of aluminum chloride, zinc chloride, stannic chloride, boric acid, boron trichloride, and boron trifluoride.

3. The method of claim 1 wherein the Lewis acid catalyst is present in an amount from about 0.05 to about 2% by weight.

4. The method of claim 1 wherein the distillation is carried out at a temperature of about 150° to about 300° C.

5. The method of claim 1 wherein the phenol sulfide is present in an amount from about 0.05 to about 1.0% by weight.

6. The method of claim 1 wherein the phenol sulfide is selected from the group consisting of thiobisnaphthols, 2,2'-thiobis phenols, 3,3'-thiobisphenols, 4,4'-thiobis(resorcinol) and t,t'-thiobis(pyrogallol).

7. A product produced by the method of claim 1.
8. A product produced by the method of claim 2.
9. A product produced by the method of claim 3.
10. A product produced by the method of claim 4.
11. A product produced by the method of claim 5.
12. A product produced by the method of claim 6.

* * * * *